United States Patent

Sourour et al.

[11] Patent Number: 6,157,820
[45] Date of Patent: Dec. 5, 2000

[54] PILOT STRENGTH MEASUREMENT AND MULTIPATH DELAY SEARCHER FOR CDMA RECEIVER

[75] Inventors: Essam Abdelfattah Sourour; Greg Bottomley; Rajaram Ramesh, all of Cary, N.C.

[73] Assignee: Ericsson Inc., Research Triangle Park, N.C.

[21] Appl. No.: 09/096,960

[22] Filed: Jun. 12, 1998

[51] Int. Cl.[7] .................................................. H04B 17/00
[52] U.S. Cl. ...................... 455/226.2; 455/423; 455/10; 455/506; 455/67.3
[58] Field of Search ............................. 455/226.2, 226.3, 455/423, 425, 439, 437, 441, 504–506, 67.3, 68–70; 375/224–228, 200–210, 346–351; 370/244, 525, 526, 595, 290

[56] References Cited

U.S. PATENT DOCUMENTS

| 4,989,221 | 1/1991 | Qureshi et al. | 375/222 |
|---|---|---|---|
| 5,504,785 | 4/1996 | Becker et al. | 375/344 |
| 5,506,906 | 4/1996 | Herrmann | 381/4 |
| 5,630,218 | 5/1997 | Muto | 455/226.2 |
| 5,673,259 | 9/1997 | Quick, Jr. | 370/342 |
| 5,787,348 | 7/1998 | Wiley et al. | 455/441 |
| 5,793,796 | 8/1998 | Hulbert | 375/150 |
| 5,793,805 | 8/1998 | Nikides | 375/224 |
| 5,796,777 | 8/1998 | Terlep et al. | 375/227 |
| 5,818,866 | 10/1998 | Wilk | 703/7 |
| 5,953,660 | 9/1999 | Ryde et al. | 455/423 |
| 6,052,598 | 4/2000 | Rudrapatna et al. | 455/456 |

FOREIGN PATENT DOCUMENTS

| 0 399 845 A2 | 11/1990 | European Pat. Off. . |
|---|---|---|
| 0 704 985 A2 | 4/1996 | European Pat. Off. . |
| 2 234 354 | 1/1991 | United Kingdom . |
| 99/13026 | 1/2000 | WIPO . |

OTHER PUBLICATIONS

S. S. H. Wijayasuriya et al., "RAKE Decorrelation as an Alternative to Rapid Power Control in DS–CDMA Mobile Radio", Proceedings of the Vehicular Technology Conference, U.S., New York, IEEE, vol. CONF. 43, pp. 368–371, XP00393198.

*Primary Examiner*—William G. Trost
*Assistant Examiner*—Charles Craver
*Attorney, Agent, or Firm*—Jenkens & Gilchrist, P.C.

[57] ABSTRACT

A method and apparatus for evaluating signal strength of a channel received at a mobile station within a spread spectrum communication systems is disclosed. If the receiver at the mobile station receives a spread spectrum signal, a first sampling means converts the received signal into a first sample stream as a first sampling. A second sampling means converts the first sample stream into a second sample stream at a second sample rate, different from the first sample rate. The signal strength of a pilot channel is measured based upon the first and second sample streams.

19 Claims, 5 Drawing Sheets

PILOT STRENGTH MEASUREMENT AND MULTIPATH DELAY SEARCHER FOR CDMA RECEIVER

BACKGROUND OF THE INVENTION

1. Technical Field of the Invention

The present invention relates to transmission of telecommunications data in a cellular communication system using spread spectrum modulation and, more particularly, to a method and apparatus for measuring pilot signal strengths and finding multipath delays for Code Division Multiple Access channels in a cellular communication system.

2. Description of Related Art

Spread spectrum communication technology has been used in military communications since the days of World War II, primarily for two purposes; to overcome the effects of strong intentional interference on a certain frequency and to protect the signal from unauthorized access. Both these goals can be achieved by "spreading" the signal spectrum to make it virtually indistinguishable from background noise, hence the term spread spectrum modulation.

Code Division Multiple Access, or CDMA, is a digital cellular spread spectrum multiple access method. In known CDMA systems, a number of base stations are typically located within a service area. Each base station uses one or more CDMA channels to communicate with one or more mobile stations located within the same service area. The base-to-mobile station transmission direction is known as the forward link or downlink and the mobile-to-base station direction is known as the reverse link or uplink.

In a CDMA system, an information data stream to be transmitted is modulated by a data sequence with a much higher data rate, referred to as a "signature sequence". Each element of the signature sequence typically represents one binary logical symbol ("0" or "1"). The signature sequence usually comprises N bits, wherein each of the N bits is denoted as a "chip". One way to generate such a signature sequence is by using a periodic binary sequence of pseudo-random signals to modulate a periodic impulse stream of period $T_c$, also referred to as "chip duration". The sequence of pseudorandom signals is also known as a pseudo noise (PN) sequence, so called because it appears random but can be replicated by an authorized receiver.

The information data stream and the high bit rate signature sequence are combined by first mapping the binary logical signals ("0" or "1") to real values ("+1" or "−1") and multiplying the two bit streams together. The combination of the lower bit rate information data stream with the higher bit rate signature sequence creates a noiselike wideband signal. This technique is called "coding" or "spreading" the information data stream and is well known in the art.

In traditional cellular communication systems, co-channel interference between channels due to spectrum reuse is one of the main limiting factors in achieving a high system capacity. One of the most notable features of CDMA technology is universal frequency reuse, which means that all users within a CDMA system occupy a common frequency spectrum allocation. This is accomplished by allocating different codes to different channels. On the downlink, each base station transmits a unique, unmodulated spreading code, denoted pilot code, pilot channel or "pilot". The pilot generally consists of a sequence of chips, each having a chip duration $T_c$. Each pilot is a different shift of a common complex sequence. Hence, on the forward link, each base station transmits a unique, unmodulated pilot channel, and may additionally transmit a synchronization channel, paging channels and traffic channels. The term "CDMA channel set" is used to refer to a set of channels transmitted by a base station.

Each mobile station in a CDMA system searches for pilot codes to detect the presence of base station signals and to measure their strengths. For purposes of this disclosure, a forward CDMA channel set containing one or more traffic channels assigned to the mobile station is referred to as an "active channel", and the pilot signal of such an active channel is referred to as an "active pilot". Conversely, a CDMA channel set which contains no traffic channels assigned to the mobile station is referred to as a "non-active channel", and the pilot signal of such a non-active channel is referred to as a "non-active pilot". Since no traffic information is transmitted from the base station to the mobile station on the non-active channels, there is no need for demodulating these channels. Thus, the mobile station must only be able to demodulate the active CDMA channel sets.

A well-known source of degradation common to all known wireless multiple access systems, particularly in terrestrial environments, is known as "multipath fading". In a multipath environment, the transmitted signal follows several propagation paths from a transmitter to a receiver, typically as a result of the signal reflecting off one or more objects before arriving at the receiver. Since the various propagation paths of the transmitted signal are of unequal lengths, several copies of the transmitted signal will arrive at the receiver with varying time delays. In a multipath fading channel, phase interference between different propagation paths of the transmitted signal may cause severe fading and result in signal dropout or cancellation.

A mobile station in a CDMA system is typically equipped with a receiver for demodulating active channels and compensating for multipath delays as described above. The receiver is generally denoted a RAKE receiver since it "rakes" all the multipath contributions together. A RAKE receiver consists of a number of processing units or RAKE fingers. When demodulating a multipath fading channel, each finger of the RAKE receiver must be synchronized with one of the diverse propagation paths of the channel. A RAKE receiver comprising L fingers is able to detect, at most, L copies of the transmitted signal, which are corrected for time delays and added coherently, (co-phased and scaled). The resulting signal will thus comprise a collection of all the time delayed copies of the transmitted signal.

As previously described, due to multipath propagation the transmitted signals will arrive at different times at the mobile station and hence result in a number of time delayed copies of the transmitted signal at the receiver. The relative time delays of the received copies of the transmitted signal must be determined in order to synchronize the various propagation paths of the signals with the corresponding fingers of the RAKE receiver. Unfortunately, the number and magnitude of the time delays may change due to movement of the mobile station, i.e., variable distance and velocity relative to the transmitting base station for users in motion. Also, movement of the mobile station may cause new channel paths to appear and old channel paths to disappear. Hence, the mobile station must continuously monitor the signals received along all propagation paths of an active channel in order to search for new, stronger channel paths. To perform this monitoring efficiently, the multipath time delays must be substantially continually measured or estimated in a fast and accurate manner.

In a cellular system conforming to the TIA/EIA/IS-95 "Mobile station—base station compatibility standard for dual mode wideband spread spectrum cellular system" standard, the ANSI J-STD-008 "Personal station—base station compatibility requirements for 1.8 to 2.0 GHz code division multiple access (CDMA) personal communications systems" standard, or other similar standards, a mobile station must be able to switch connection from a first base station to a second base station if the second base station provides a stronger signal to the mobile station, a procedure known as "handoff". As described in the standards documentation, the handoff may be accomplished through either a "hard" handoff or a "soft" handoff.

In hard, or traditional, handoff, the connections to different base stations use different frequencies, which means that the connection to the old base station is broken before the connection to the new base station is set up. However, because of the universal frequency reuse in a CDMA system, it is possible to set up the connection to a new base station before leaving the old base station, a procedure known as soft handoff. According to the above-identified standards, the mobile station must continuously measure the signal strengths for all received pilots in order to decide if a handoff, either hard or soft, is required.

Both of the two functions just described, i.e., searching for stronger paths for active channels using time delay estimates and continuously measuring pilot signal strengths for received channels, are typically performed by a circuit in the mobile station generally denoted a "searcher". The searcher specifies a window of correlation, also referred to as a search window, for each received pilot signal. The search window consists of a predetermined number of consecutive chips among which the probability of finding usable multipath components of the corresponding channel is high. To specify the search window for a particular pilot, a locally generated replica (local pilot) of that particular pilot is used for correlation with the received pilot. The search window is centered around the earliest arriving usable multipath component (correlation peak) of the pilot, which occurs when the received pilot matches the locally generated pilot. The search window further employs a search range of W chips on either side of the center, where W is a predefined number as specified in either of the standards TIA/EIA/IS-95 or ANSI J-STD-008 as referred to above.

The conventional technique for performing the correlation described above is by using an "integrate and dump" correlator, which integrates the received signals during a given time period and then resets itself. The correlation peaks for each search window are detected, and the results are used to calculate the pilot strength for the corresponding pilots. Also, the estimated multipath delays for the active channels to be demodulated are calculated based on the correlation results. These estimated multipath delays are used to synchronize each finger of the RAKE receiver with one of the propagation paths of the active channels as previously described.

Prior searcher techniques typically employ integrate and dump correlation for each separate multipath delay in each search window. Such a method is calculation intensive which makes the search process relatively slow. Consequently, valuable time which could be used to improve the accuracy of the search results is wasted.

Accordingly, there is a need in the art for an improved method and apparatus for searching for stronger paths for active CDMA channels while continuously measuring pilot signal strengths for all received CDMA channels. The present invention uses new techniques to generate and process a search window for each pilot in the system, resulting in faster and more accurate measurements.

SUMMARY OF THE INVENTION

The present invention overcomes the foregoing and other problems, with a method and apparatus for evaluating the signal strength of a CDMA channel received at a mobile station in a spread spectrum communication system. The receiver at the mobile station receives a pilot signal for the channel being evaluated. The pilot signal is converted at a first sampling means into a first sample stream having a first sampling rate. The first sample stream is next converted at a second sampling means into a second sample stream having a second sampling rate that is different from the first sampling rate. The signal strength of the channel is measured based upon the first and second sample streams.

The process of measuring the signal strength of the channel involves generating, with a sliding correlator, a search window for the first sample stream by multiplying a local section of the pilot signal with a second section of the pilot signal in order to obtain a sequence of correlated values, and centering the search window around the earliest detected correlation peak of the correlation values. The signal strength of the second sample stream is measured using the search window. The generated search window may even be averaged using previously generated search windows for the pilot signal and may improve the generated samples of the search window with a smoothing factor using previously generated samples for the pilot signal.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
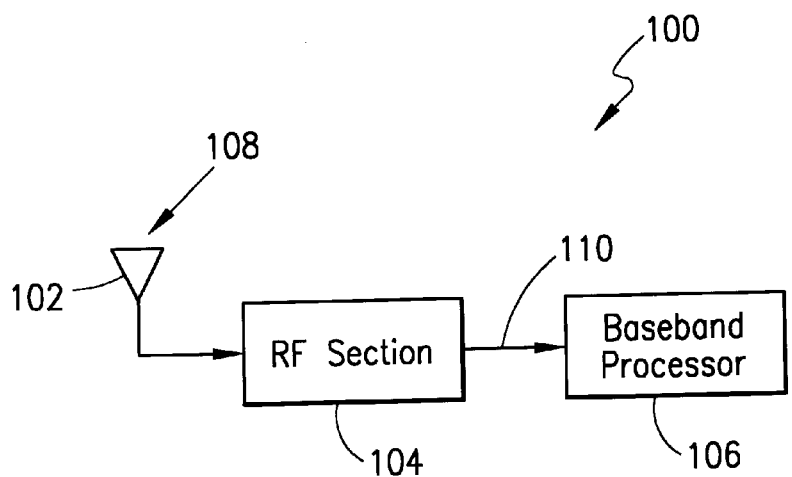
FIG. 1 shows a conventional CDMA receiver.

Referring now to the drawings, and more particularly to FIG. 1, wherein there is illustrated a simplified block diagram of a conventional CDMA receiver 100. A pilot signal 108 is received by an antenna 102 and converted in a RF section 104 into a complex baseband signal 110 which is comprised of a "real" or in-phase component and an "imaginary" or quadrature-phase component. According to the IS-95 standard, all pilot signals in a CDMA system must have a chip waveform which follows approximately a Sinc function which is defined as $Sinc(y)=(\sin y)/y$. In particular, the chip waveform is approximately $Sinc(\pi t/T_c)$.

Consequently, the chip waveform of the complex baseband signal 110 will also approximately follow a Sinc function. The complex baseband signal 110 is fed to a baseband processor 106 for further processing as described below.

Figure 2:
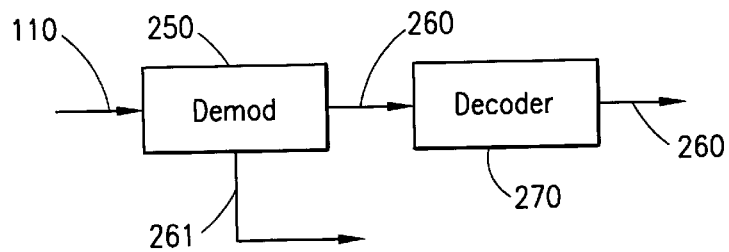
FIG. 2 shows a baseband processor for processing a complex baseband signal in the CDMA receiver shown in FIG. 1.

FIG. 2 shows an internal configuration of the baseband processor 106 of FIG. 1. The received signal 110 is encoded by demod unit 250, which produces soft bit values 260 and pilot strength measurements 261. Soft valves 260 are further processed at decoder 270, which performs forward error correction decoding and error detection to produce processed bits 280. Alternatively, demod unit 250 may produce only hard bits rather than soft bits 260 and pilot strength measurements 261.

Figure 3:
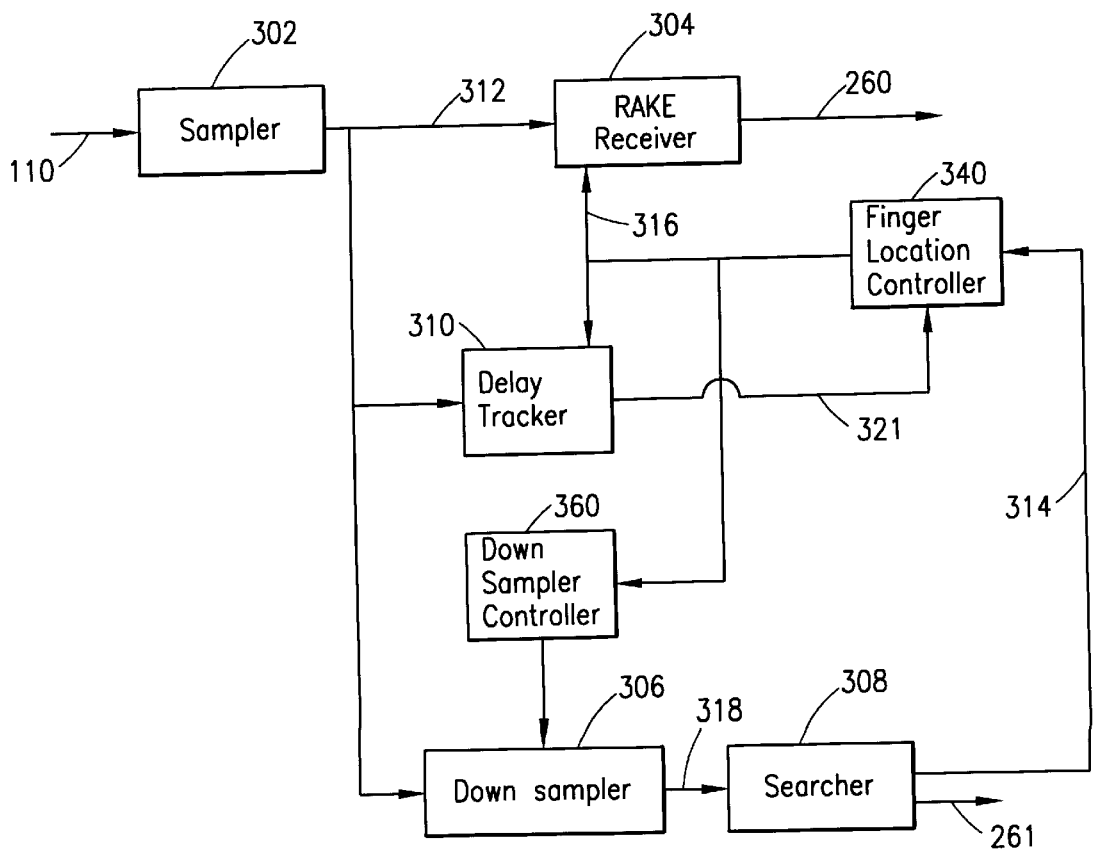
FIG. 3 shows a baseband processor for processing an active pilot channel in accordance with the present invention.

The present invention relates to the demod unit 250 in FIG. 2. A demod unit 250 according to the present invention is illustrated in FIG. 3. The complex baseband signal 110 is fed into a sampler 302 which samples the baseband signal 110 at a specified rate and generates a sample stream 312. The baseband signal 110 can be sampled, for example, at eight times per chip. The sample stream 312 is provided to a RAKE receiver 304 for data detection, as well as to a delay tracker 310 and a down sampler 306. The down sampler 306 provides decimated samples to searcher 308. The searcher 308 performs signal strength measurements on the received signal. Also, the searcher 308 provides measurements to finger location controller 340, as does delay tracker 310. Finger location controller 340 estimates multipath delays for the active channels to be demodulated. Multipath delay estimates 316 are fed by finger location controller 340 to delay tracker 310 and RAKE receiver 304. The RAKE receiver 304 uses the adjusted delay estimates 316 to optimally assign samples of the sample stream 312 to each of the corresponding fingers.

The delay tracker 310 of FIG. 3 also monitors the delay estimates 316 to adjust for variations in distance and velocity relative to the transmitter, a process generally known as "tracking". After feeding the delay measurements 321 to the finger location controller 340, the delay tracker 310 continues to track the delays. A method to improve and track delay estimates with delay tracker 310 is described in an article entitled "A new tracking loop for direct sequence spread spectrum systems on frequency selective fading channels", IEEE Trans. on Comm., Vol. 43, No. 12, December 1995 by W. Sheen and G. Stuber, the disclosure of which is hereby incorporated by reference.

In accordance with one aspect of the present invention, the complex baseband signal 110 of FIG. 1 is sampled not once but twice per chip, using the down sampler 306 in FIG. 3. The down sampler 306 samples the sample signal 312 at a rate lower than the sampling rate of the sampler 302, resulting in a decimated sample signal 318 being fed to the searcher 308. This process is generally referred to as "down sampling". As those skilled in the art will readily appreciate, down sampling the sample signal 312 may advantageously result in a reduction in the hardware complexity of the searcher 308.

However, when measuring the signal strength of a sampled pilot signal, it is advantageous if one of the samples is positioned at the peak of the chip waveform, i.e., at the peak of the Sinc function. For purposes of illustration, the sampled signal 312 has a sample rate of eight samples per chip, and the decimated sample signal 318 has a sample rate of two samples per chip. With a sampling rate of eight samples per chip, it may be assumed with a high probability that one of the eight samples will be situated at or near the peak of the chip waveform. However, when down sampling the signal from eight samples per chip to two samples per chip, as described above, the probability that one of the two samples will be positioned at the peak of the chip waveform is dramatically reduced. Hence, the two samples per chip of the decimated sample signal 318 should be chosen in such a way that one of the two samples will likely be at the peak of the chip waveform of the corresponding pilot. This type of down sampling is referred to as "optimum down sampling". Additionally, the position of the first sample to be down sampled is referred to as down sampling phase.

In accordance with one aspect of the present invention, a method for selecting a down sampling phase will now be described with respect to both active pilots and non-active pilots. It should be understood that the structure, control and arrangement of the conventional components and circuits have, for the most part, been illustrated in the drawings by readily understandable block representations and schematic diagrams, which show only those specific details that are pertinent to the present invention. These block representations and schematic diagrams have been employed in order not to obscure the disclosure with structural details which will be readily apparent to those skilled in the art having the benefit of the description herein.

Referring back to FIG. 3, the complex baseband signal 110 is fed to a sampler 302, which samples the baseband signal 110 at a specified rate. For purpose of description, it is assumed that the baseband signal 110 is sampled at a rate of eight samples per chip. The sample stream 312 is provided to the RAKE receiver 304, the delay tracker 310 and the down sampler 306 in accordance with the present invention. Each sample in a group of eight samples per chip being fed into the down sampler 306 is denoted $s_i^j$, where i is a chip number and j is a sample number within a chip having a value of 1 to 8. The samples in the sample signal 312 are received by the down sampler 306 in the following order:

$$\ldots, s_1^i, s_i^2, s_i^3, \ldots s_i^8, s_{i+1}^1, s_{i+1}^2, \ldots s_{i+1}^8, s_{i+1}^2, \ldots$$

We now assume that sample $s_i^j$ is taken at the peak of the waveform of chip i for the sample signal 312. When down sampling the sample signal 312 at eight samples per chip to the decimated sample signal 318 at two samples per chip, the decimated sample signal 318 will comprise every fourth sample of the sample signal 312. Hence, after down sampling the sample signal 312 as described, the decimated sample signal 318 will for each chip consist of the two samples $s_i^j$ and $s_i^{j+4}$ where j denotes the down sampling phase or position.

In accordance with one aspect of the present invention, the complex baseband signal 110 is associated with an active CDMA channel. In addition to measuring the pilot strength of the received signal by using correlation techniques, the searcher 308 will calculate the estimated multipath delays for the decimated sample signal 318, based on correlation results. The searcher 308 provides the finger location controller 340 with multipath delay estimates 314 for the decimated sample signal 318. The finger location controller 340 will maintain, at most, a number L of delay estimates 316 where the number L is the number of fingers in the RAKE receiver 304. For purpose of illustration, it is assumed that the delay tracker 310 tracks L active channels. Since the down sampler 306 down samples the sample signal 312 twice per chip, the accuracy of the delay estimates 314 is limited to within a half of a chip duration, or $T_c/2$. The delay tracker 310 improves the accuracy of the delay estimates 316 using known mathematical methods as described in "A new tracking loop for direct sequence spread spectrum systems on frequency selective fading channels", IEEE Trans. on Comm., Vol. 43, No. 12, December 1995 by W. Sheen and G. Stuber, and feeds new, more accurate delay estimates 321 to the finger location controller 390. In accordance with one aspect of the present invention, the finger location controller 340 also provides the down sampler controller 360 with the down sampling phase of the strongest channel path being tracked by the delay tracker 310. In accordance with another aspect of the present invention, the finger location controller 340 provides the down sampler controller 360 with the down sampling phase of the first channel path being tracked by the delay tracker 310. Hence, in accordance with the present invention, the searcher 308 will provide the finger location controller 340 with increasingly accurate estimates of the channel delays for active channels.

Figure 4:
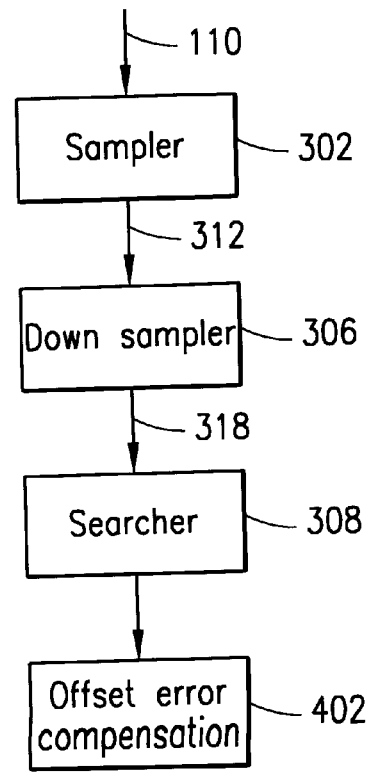
FIG. 4 shows a baseband processor for processing a non-active pilot channel in accordance with the present invention.

In accordance with another aspect of the present invention, as illustrated in FIG. 4, the complex baseband signal 110 is associated with a non-active CDMA channel. Since no traffic information is transmitted on a non-active channel, there is no need for demodulating the baseband signal 110. Consequently, no multipath delay estimation is performed by the searcher 308 for non-active channels. As illustrated in FIG. 4, the complex baseband signal 110 associated with a non-active CDMA channel is sampled by the sampler 302 and down sampled by the down sampler 306 as previously described. Since the method for searching for optimum down sampling phases for active pilots as illustrated by FIG. 3 involves the delay tracker 310, this method is not applicable for non-active pilots. Hence, the optimum down sampling phases are not known for pilots of non-active CDMA channels. If the searcher 308 was to use an arbitrary sampling position of the non-active pilot, it may result in an unknown error when measuring the signal strength of the non-active pilot.

To reduce the error in accordance with one aspect of the present invention, the down sampling phase is changed sequentially over a number of consecutive samples when measuring non-active channels. When initially receiving a particular pilot of a non-active channel, the down sampler 306 may down sample the received sample stream 312 at samples $s_i^j$ and $s_i^{j+4}$ where i is a chip number and j is an arbitrary sample number as previously described. For purpose of illustration, the down sampling phase may be changed sequentially over four consecutive samples. At subsequent search windows for the same pilot, the down sampling phase is changed sequentially to j+1, j+2, j+3, j, j+1, j+2, etc. When using various down sampling phases for subsequent search windows, measuring the signal strength of one particular pilot, the resulting error is the average of all errors due to all possible down sampling phases. With down sampling from eight to two samples per chip, there are four possible down sampling phases. For a Sinc chip waveform, the average error, using known mathematical methods, can be calculated using the formula:

$$\text{average error} = 0.250 \sum_{j=1}^{4} 10 \log \text{Sinc}^2 (n(j-1)/8)$$

which yields −0.34 dB. Hence, with sequential down sampling in accordance with the present invention, the average error becomes a known factor, and the offset value, in this case 0.34 dB, can be added to the resulting signal strength of non-active pilots. This avoids the problem of an unknown error due to non-optimum down sampling of non-active channels. As will be discussed more fully below, the offset value is added to the pilot signal strength in an offset error compensation block 402 of FIG. 4.

Figure 5:
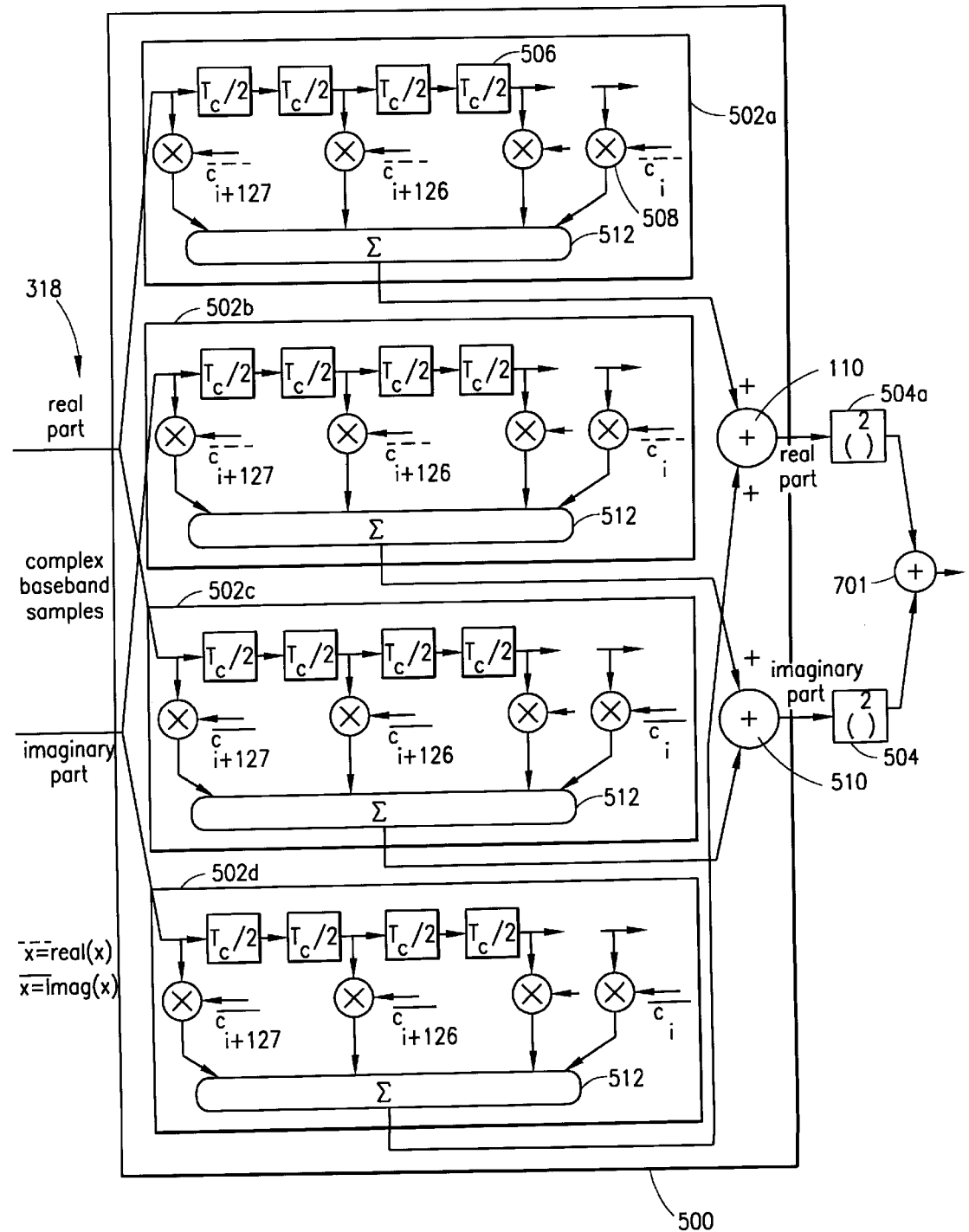
FIG. 5 shows a sliding correlator with complex square law envelope output for measuring pilot signal strength in accordance with the present invention.

Once the optimum down sampling phases are chosen, a search window must be specified for each particular pilot. This is accomplished by locally generating a replica of the particular pilot for correlation with the received pilot. In accordance with one aspect of the invention, a sliding correlator is used for performing the correlation. FIG. 5 shows a block diagram of a conventional complex sliding correlator 500 which is located in block 308 of FIG. 3. The sliding correlator 500 has correlating units 502a, 502b, 502c and 502d for correlating the real and imaginary components of the decimated sample signal 318, and two summers 510. Corresponding squaring devices 504a and 504b square the respective added outputs of the correlating units 502a and 502d and the correlating units 502b and 502c.

Each correlating unit 502a, 502b, 502c and 502d comprises delay taps 506, multiplying taps 508 and a summer 512. The decimated sample signal 318 is provided to the delay taps 506. The series of delay taps 506 effectively functions as a first-in-first-out (FIFO) register, or queue. Since there are two samples per chip, the sample values move from one delay tap to the next delay tap at twice the chip rate. The sample values present in the delay taps 506 are provided to the multiplying taps 508, where they are multiplied by tap coefficients corresponding to samples of a particular section of the pilot code. Each of the particular sections of pilot code are denoted as a local section. For example, the number of multiplying taps 508 shown in FIG. 5 is 128, denoted $C_i$ to $C_{i+127}$, which in combination constitute one local section. To reduce complexity, it is preferred to use the flexible sliding correlator described in co-pending application U.S. Ser. No. 09/024,120, "Flexible Sliding Correlator for Direct Sequence Spread Spectrum Systems", Attorney Docket No. 27575-087.

Figure 6:
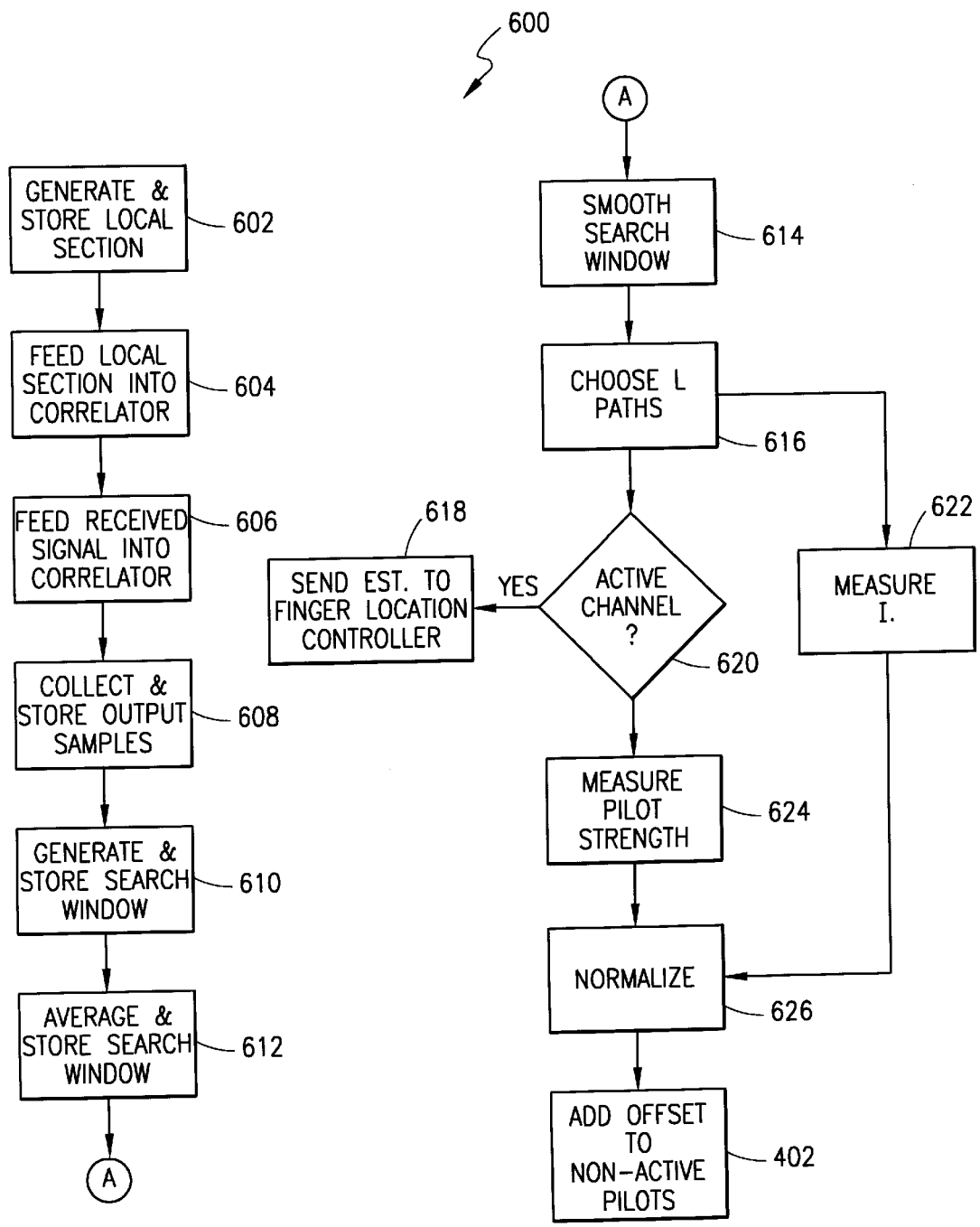
FIG. 6 is a flowchart showing the function of a searcher in accordance with the present invention.

In accordance with one aspect of the present invention, the searcher 308 comprises a sliding correlator that can be sequentially loaded with an arbitrary local section of the received pilot code. The purpose of the sliding correlator is to perform correlation for any pilot in the system. Also, a section of randomly chosen chips, not corresponding to any pilot in the system, can be loaded into the sliding correlator to measure total received spectral density $I_0$, if necessary. FIG. 6 is a flowchart 600 describing the function of the searcher 308 in greater detail.

For purpose of illustration, it can be assumed that each mobile station in the CDMA system has a list of pilots to measure. It is also assumed that the pilot to be measured is pilot number n on the list of all pilots to be measured for a particular mobile station and that the search window size is W chips. As illustrated in FIG. 6, a local section of pilot number n is generated and stored in a memory in step 602. In step 604, the local section of the pilot is fed into the multiplying taps of the sliding correlator. Preferably, the local section is loaded into the sliding correlator at least $WT_c/2$ seconds before pilot number n is going to correlate.

To generate a search window for a particular pilot, the received signal is loaded into the delay taps of the sliding correlator in step 606. Samples may be constantly loaded all the time, or loading may be turned on and off to save power. At the output of the sliding correlator, 2*W+1 output samples are collected and stored in a memory in step 608. The output samples are denoted $u^n(m)$, where n is the pilot number as described above and m corresponds to a particular delay from the peak correlation in the search window and has a value in the range −W to W. As will be apparent to those skilled in the art, $u^n(m)$ is thus the sliding correlator output due to pilot number n with a delay of m samples (m/2 chips) from the peak correlation. A delay of m=0 would indicate that the received samples match the local section in the sliding correlator.

Based on the correlation results, search windows for the particular pilot are generated and stored in memory in step 610. After using local sections of a first pilot to correlate with the first pilot, local sections of a second pilot are loaded into the sliding correlator for correlation with the second pilot. The local sections may be replaced by a random sections, comprising a sequence of randomly chosen chips, which are loaded into the correlator to generate windows of total received spectral density $I_0$ measurements. The search windows for each pilot, and the windows of $I_0$ measurements, are processed as described below.

Figure 7:
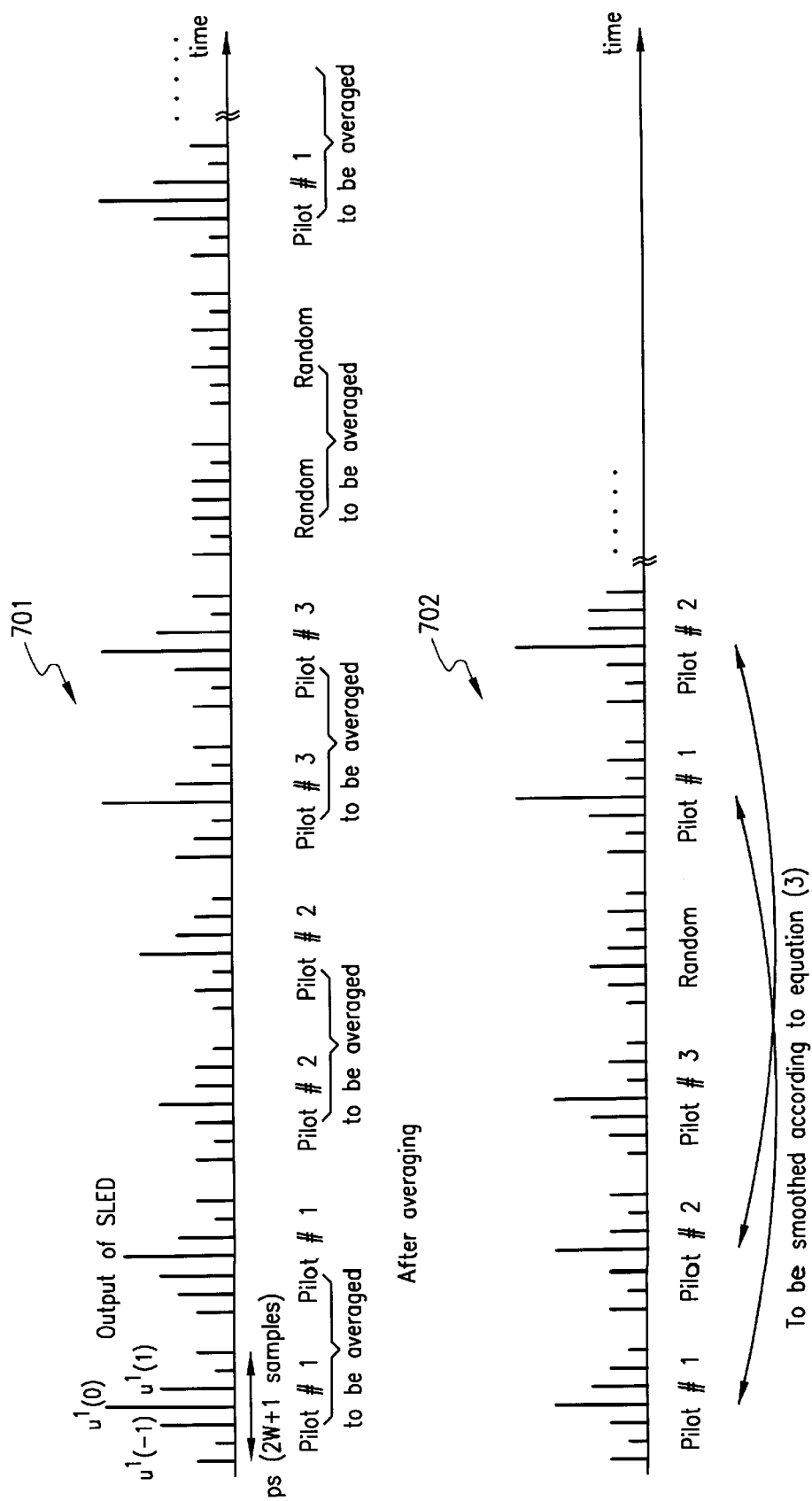
FIG. 7 shows an example of a combination of a plurality of search windows for a corresponding plurality of pilot signals.

Output samples corresponding to a search windows for a single pilot are averaged with previous search windows of the same pilot in step 612. The process returns to step 602 of FIG. 6, where a new local section corresponding to the next pilot is loaded into the correlator. Generating and averaging search windows for the same pilot may be performed an arbitrary number of times. For purpose of illustration, the process for a particular pilot is performed V times for this example V=2 (FIG. 7).

Thereafter, a local section of a new, second pilot is loaded into the multiplying taps of the sliding correlator. The new local section corresponds to the second pilot to be measured. This process may be repeated V times. The output samples from the sliding correlator corresponding to the search window of the second pilot are also collected, averaged and stored in step 612. This process continues until all pilots on the list are measured, and the corresponding search windows are generated and stored. A random local section is also loaded and the sliding correlator samples are averaged. The cycle is repeated continuously, i.e., the first pilot window is measured again, and so on.

In step 614, output samples from the sliding correlator corresponding to pilot number n having identical delay estimates are continuously smoothed by a smoothing factor p. Hence, whenever a new averaged search window for the same pilot is measured, the "old" samples are smoothed with the "new" samples using the formula:

$$u_{smooth}^n(m) = p \cdot u_{old}^n(m) + (1-p) \cdot u_{new}^n(m)$$

where, as previously described, $u_{old}^n(m)$ is the "old" output sample for pilot number n with a delay of m samples (m/2 chips), $u_{new}^n(m)$ is the corresponding "new" sample and p is the smoothing factor. This smoothing applies also to the window resulting from the random local section. Hence, at any time there is stored in memory averaged and smoothed windows due to the outputs $u^n(m)$ from the sliding correlator for each pilot and an averaged and smoothed window due to the random local section. In a preferred embodiment, the smoothing factors are approximately p=0.99 or p=0.96.

For purposes of illustration, FIG. 7 shows an example with three pilots and a search window having a duration of seven samples (W=3). Two search windows for each pilot are averaged (V=2) and smoothed in accordance with the present invention. In FIG. 7, we assume that there are three pilots (#1,#2,#3) and that measurements of the total received power spectral density ($i_0$) will be performed. The search window size is further assumed to be W=3 chips and that two search windows for the same pilot will be averaged (V=2). A local section corresponding to pilot #1 is loaded into the complex sliding coorelator 500 to generate the first search window for pilot #1. This search window is stored as indicated at step 610. Another section corresponding to pilot #1 is located into the complex sliding coorelator 500 to generate the second search window for pilot #1. The second search window is averaged sample by sample with the previous search window for pilot #1 during step 612. Since V=2 only two search windows are averaged.

Similarly, two other sections are used to generate two successive search windows for pilot #2. These two search windows are also averaged. The same process is repeated for pilot #3 and two other random sections. The same procedure is continuously repeated and the output samples 701 (before averaging) and 702 (after averaging) are generated. Search windows corresponding to the same pilot are smoothed according to the smoothing formula discussed previously with smoothing factor P. Thus, one search window for each pilot is generated along with one search window for the random sections.

In accordance with another aspect of the present invention, the smoothing factor p is set equal to Ø to disable smoothing. As those skilled in the art will readily appreciate, setting the smoothing factor p equal to Ø may advantageously result in a reduction in the memory storage required for implementing the invention. In this case, the search window is fully analyzed once the results of one pilot are averaged. After the results of one pilot are averaged, the search window corresponding to this pilot is deleted from memory and hence the memory is used for the next pilot.

After averaging and smoothing of windows, in step 616 L channel paths are selected using the peaks of the search window for each pilot. For active channels, these peaks are fed to the finger location controller 340 in step 620. Also, for all pilots the peaks are also used for pilot strength measurement as described below. Hence, the L strongest sample values for all search windows are used for pilot strength measurement in step 624. This procedure will now be described in greater detail.

For the purpose of illustration, signal strength of a pilot is denoted by u. The signal strength u of a pilot is measured by computing the ratio of the received pilot energy per chip $E_c$ to the total received spectral density $I_0$ for at most L usable multipath components. These ratios for each multipath component are then added. Hence, the signal strength u of a pilot is given by the equation:

$$u = \text{pilot strength} = 1/I_o \sum_{l=1}^{L} E_{c,l}$$

where $E_{c,1}$ represents the power spectral density due to pilot channel path number 1.

In one aspect of the invention, the total received spectral density $I_0$ is found by averaging all samples in the search window generated by the random local section. This is accomplished by adding window samples and dividing by the total number of samples in step 622. In another aspect of the invention, $I_0$ does not need to be measured, as automatic gain control (AGC) is present, which normalizes the received samples. In this case, $I_0$ is known and can be easily mapped into units corresponding to the $E_{c,l}$ measurements.

To measure the signal strength u of the pilot, the averaged and smoothed output samples $u_{smooth}^n(m)$ from the sliding correlator, i.e., the averaged and smoothed search windows which are stored in memory, are used. To generate signal strength u measurement for a particular pilot, such as pilot number n, the strongest L samples of all $u_{smooth}^n(m)$ are found. The signal strength for each of these samples is denoted $P_l$, where l is a path number having a value between 1 and L. These samples correspond to the strongest channel paths. Since the sample delay estimates have an accuracy limited to within a half of a chip duration, or $T_c/2$, the samples are selected at least a chip away from each other, i.e. non-consecutive samples.

The signal strength values $P_l$ must be normalized by the effect of all other CDMA channels. To normalize the pilot strength due only to pilot n, step 626 is performed in the following way. The measured value of the total received power spectral density $I_0$ and the L measured signal strength values $P_l$ are supplied to block 626. The total received power spectral density $I_0$ can be modeled as:

$$I_o = E_{c,1} + \xi_1$$

where $\xi_1$ represents the total received power spectral densities, excluding the pilot channel path number 1 being measured. It should be noted that the total received power spectral density $I_0$ is not a function of the path number 1. When the sliding correlator is in match with a path of one pilot, each output peak $\{P_l\}$, after being averaged and smoothed over many measurements, is modeled as:

$$P_l = M^* E_{c,1} + \xi_1$$

where M is the length of the sliding correlator in chips. For purpose of illustration, M is set equal to 128 in FIG. 5. Combining the three equations above, the estimated pilot strength after removing interference is given by:

$$u = \frac{l}{(m-1)I_o} \sum_{l=1}^{L} (P_l - I_o)$$

The estimated signal strength u of the pilot is fed to block 402. For all non-active pilots, an offset value is added. For purpose of illustration, an offset of 0.34 dB is added (assuming a Sinc chip waveform) in accordance with FIG. 4. As previously described, this offset is the result of changing the sampling position sequentially when generating the search window for the non-active pilots. For pilot strength of active pilots, the signal strength values received from step 626 are left unchanged.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for evaluating a channel's signal strength at a mobile station comprising the steps of:

receiving a signal;

converting the received signal into a first sample stream according to a first sampling rate;

converting the first sample stream into a second sample stream according to a second sampling rate, wherein the second sampling rate is different than the first sampling rate;

generating a search window for the first sample stream using a sliding correlator; and measuring the signal strength of the second sample stream using the search window.

2. The method of claim 1, wherein the step of generating includes the steps of:

feeding an arbitrary local section of the signal into a delay part of the sliding correlator;

feeding a section of the received signal into a multiplying part of the sliding correlator; and multiplying the sections sequentially with each other to obtain a sequence of correlation values.

3. The method of claim 2, wherein the step of generating further comprises the steps of:

averaging the search window using previously generated search windows for the pilot signal; and smoothing the generated samples of the search window with a smoothing factor using previously generated samples.

4. The method of claim 3, wherein the smoothing factor is approximately 0.96.

5. The method of claim 3, wherein the smoothing factor is approximately 0.99.

6. The method of claim 1, wherein the step of converting the received signal further comprises the step of:

selecting an optimal down sampling phase for the second sample stream.

7. The method of claim 6, wherein the step of selecting comprises the step of:

extracting the optimal down sampling phase from a tracking unit which has been tracking the signal.

8. The method of claim 6, wherein the step of selecting comprises the step of:

selecting an arbitrary sampling phase which is changed sequentially for each measurement.

9. The method of claim 8, wherein the arbitrary sampling phase is changed sequentially over four consecutive sampling phases.

10. The method of claim 1, wherein the second sampling rate is lower than the first sampling rate.

11. The method of claim 1, wherein the step of converting the first sample stream comprises the step of:

sampling the first sample stream at a rate of two samples per chip.

12. An apparatus for evaluating CDMA channel signal strength at a mobile station in a spread spectrum communications system, comprising:

a receiver for receiving a signal;

first sampling means for converting the received signal into a first sample stream according to a first sampling rate;

second sampling means for converting the first sample stream into a second sample stream according to a second sampling rate, wherein the second sampling rate is different than the first sampling rate;

a sliding correlator for generating a search window for the first sample stream; and a measurer for measuring the signal strength of the second sample stream using the search window.

13. A method for evaluating CDMA channel signal strength at a mobile station comprising the steps of:

receiving a CDMA signal;

converting the received CDMA signal into a first sample stream according to a first sampling rate;

converting the first sample stream into a second sample stream according to a second sampling rate, wherein the second sampling rate is lower than the first sampling rate;

selecting an optimal down sampling phase for the second sample stream;

generating a search window for the first sample stream using a sliding correlator;

measuring the CDMA signal strength of the second sample stream using the search window.

14. The method of claim 13, wherein the step of generating includes the steps of:

feeding an arbitrary local section of the CDMA signal into a delay part of the sliding correlator;

feeding the received CDMA signal into a multiplying part of the sliding correlator; and multiplying the sections sequentially with each other to obtain a sequence of correlated values.

15. The method of claim 14 further including the step of:

centering a search window around the earliest detected correlation peak among the correlation values.

16. The method of claim 14, wherein the step of generating further comprises the steps of:

averaging the search window using previously generated search windows for the CDMA signal; and smoothing the generated samples of the search window with a smoothing factor.

17. The method of claim 13, wherein the step of selecting comprises the step of:

extracting the optimal down sampling phase from a tracking unit which has been tracking the CDMA signal.

18. The method of claim 13, wherein the step of selecting comprises the step of:

selecting an arbitrary sampling phase which is changed sequentially for each measurement.

19. The method of claim 13, wherein the arbitrary sampling phase is changed sequentially over four consecutive sampling phases.

* * * * *

UNITED STATES PATENT AND TRADEMARK OFFICE
CERTIFICATE OF CORRECTION

PATENT NO. : 6,157,820
DATED : December 5, 2000
INVENTOR(S) : Sourour et al.

It is certified that error appears in the above-identified patent and that said Letters Patent is hereby corrected as shown below:

Column 6,
Line 38, replace "......, $s^1_i, s^2_i, s^3_i, ..... s^8_i, s^1_{i+1}, s^2_{i+1}, ..... s^8_{i+1}, s^2_{i+1}, ........$"

with --......, $s^1_i, s^2_i, s^3_i, ..... s^8_i, s^1_{i+1}, s^2_{i+1}, ..... s^8_{i+1}, s^2_{i+1}, ........$--

Line 40, replace "$s^j_i$" with --$s^i_j$--

Column 7,
Line 58, replace "$average\ error = 0.250 \sum_{j=1}^{4} 10\ log\ sinc^2\ (n(j-1)/8)$"

with --$average\ error = 0.250 \sum_{i=1}^{4} 10\ log\ sinc^2\ (n(j-1)/8)$--

Column 9,
Line 44, replace "$u_{smooth}{}^n(m) = p*u_{old}{}^n(m) + (1-p)*u_{new}{}^n(m)$"

with --$u^n_{smooth}(m) = p*u^n_{old}(m) + (1-p)*u^n_{new}(m)$--

Line 48, replace "$u_{new}{}^n(m)$" with --$u^n_{new}(m)$--

Column 10,
Line 61, replace "$u_{smooth}{}^n(m)$" with --$u^n_{smooth}(m)$--

Line 65, replace "$u_{smooth}{}^n(m)$" with --$u^n_{smooth}(m)$--

Signed and Sealed this

Twenty-fifth Day of December, 2001

Attest:

*Attesting Officer*

JAMES E. ROGAN
*Director of the United States Patent and Trademark Office*